(12) United States Patent
Wen et al.

(10) Patent No.: US 12,323,232 B2
(45) Date of Patent: Jun. 3, 2025

(54) MULTI-CARRIER TRANSMITTER WITH INTEGRATED MULTIPLEXER AND RECEIVER WITH INTEGRATED DEMULTIPLEXER

(71) Applicant: Lumentum Operations LLC, San Jose, CA (US)

(72) Inventors: Joe Qingzhe Wen, Fremont, CA (US); Zhong Pan, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 59 days.

(21) Appl. No.: 18/066,006

(22) Filed: Dec. 14, 2022

(65) Prior Publication Data

US 2024/0080124 A1     Mar. 7, 2024

Related U.S. Application Data

(60) Provisional application No. 63/374,779, filed on Sep. 7, 2022.

(51) Int. Cl.
*H04J 14/06* (2006.01)
*H04B 10/61* (2013.01)

(52) U.S. Cl.
CPC ............ *H04J 14/06* (2013.01); *H04B 10/614* (2013.01); *H04B 10/6163* (2013.01)

(58) Field of Classification Search
CPC .... H04J 14/06; H04B 10/614; H04B 10/6163
USPC .......................................................... 398/65
See application file for complete search history.

(56) References Cited

U.S. PATENT DOCUMENTS

| | | | | |
|---|---|---|---|---|
| 9,195,079 B2* | 11/2015 | Doerr | ................... | H04B 10/614 |
| 9,634,787 B2 | 4/2017 | Tanimura et al. | | |
| 10,009,106 B2* | 6/2018 | Doerr | ................... | H04B 10/505 |
| 2004/0218259 A1* | 11/2004 | Hui | ....................... | G02F 1/2257 |
| | | | | 359/344 |

(Continued)

FOREIGN PATENT DOCUMENTS

JP     2017011471 A  *  1/2017  ......... H04B 10/2563

OTHER PUBLICATIONS

Chen et al; A Multi-Carrier QAM Transceiver for Ultra-Wideband Optical Communication; Aug. 2006; IEEE; pp. 1-18. (Year: 2006).*

(Continued)

*Primary Examiner* — Amritbir K Sandhu
(74) *Attorney, Agent, or Firm* — Harrity & Harrity, LLP

(57) ABSTRACT

In some implementations, an optical receiver includes a demultiplexing component configured to demultiplex a reception signal into a first reception signal and a second reception signal, a first polarization beam splitter configured to split the first reception signal into a first optical signal associated with a first polarization and a second optical signal associated with a second polarization, a second polarization beam splitter configured to split the second reception signal into a third optical signal associated with the first polarization and a fourth optical signal associated with the second polarization, a first demodulation component configured to mix the first optical signal and the second optical signal with a first local oscillator signal, and a second demodulation component configured to mix the third optical signal and the fourth optical signal with a second local oscillator signal.

20 Claims, 9 Drawing Sheets

(56) References Cited

U.S. PATENT DOCUMENTS

| | | | |
|---|---|---|---|
| 2009/0245795 A1 | 10/2009 | Joyner et al. | |
| 2010/0080571 A1 | 4/2010 | Akiyama et al. | |
| 2011/0243556 A1* | 10/2011 | Nagarajan | H04J 14/06 398/43 |
| 2011/0255858 A1* | 10/2011 | Xie | H04J 14/06 398/1 |
| 2012/0224846 A1 | 9/2012 | Swanson et al. | |
| 2013/0136451 A1* | 5/2013 | Yoshida | H04J 14/06 398/65 |
| 2014/0153931 A1 | 6/2014 | Doerr | |
| 2014/0205286 A1* | 7/2014 | Ji | H04J 14/0298 398/45 |
| 2014/0314368 A1 | 10/2014 | Chien et al. | |
| 2016/0204891 A1* | 7/2016 | Kato | H04B 10/43 398/79 |
| 2018/0067342 A1* | 3/2018 | Mekis | G02B 6/29344 |
| 2018/0139007 A1 | 5/2018 | Kamei et al. | |
| 2018/0143376 A1 | 5/2018 | Kamei et al. | |
| 2018/0159630 A1 | 6/2018 | Griffin | |
| 2019/0196097 A1 | 6/2019 | Takechi | |
| 2019/0229811 A1 | 7/2019 | Gupta et al. | |
| 2020/0064404 A1 | 2/2020 | Sugiyama | |
| 2020/0382217 A1* | 12/2020 | Younce | H04B 10/614 |
| 2022/0149952 A1 | 5/2022 | Chanclou | |
| 2024/0080124 A1* | 3/2024 | Wen | H04J 14/06 |

OTHER PUBLICATIONS

Hai et al; A Thermally Tunable 1×4 Channel Wavelength Demultiplexer Designed on a Low-Loss Si3N4 Waveguide Platform; Nov. 2015; MDPI photonics; pp. 1-16. (Year: 2015).*

Ying et al; Two-mode mode multiplexer/demultiplexer in polymer planar waveguide; Jan. 2014; pp. 1-7. (Year: 2014).*

Fujitsu Introduces World's First Dual Carrier Integrated Coherent Receiver for 400G Optical Networks, Fujitsu Optical Components, Feb. 1, 2016, Website: https://www.fujitsu.com/jp/group/foc/en/resources/news/press-releases/2016/20160201-2.html, 3 Pages.

* cited by examiner

MULTI-CARRIER TRANSMITTER WITH INTEGRATED MULTIPLEXER AND RECEIVER WITH INTEGRATED DEMULTIPLEXER

CROSS-REFERENCE TO RELATED APPLICATION

This patent application claims priority to U.S. Provisional Patent Application No. 63/374,779, filed on Sep. 7, 2022, and entitled "MULTI-CARRIER COHERENT TRANSMITTER/RECEIVER WITH INTEGRATED MULTIPLEXER/DEMULTIPLEXER BASED ON A TUNABLE DELAY LINE INTERFEROMETER." The disclosure of the prior application is considered part of and is incorporated by reference into this patent application.

TECHNICAL FIELD

The present disclosure relates generally to optical communication and to a multi-carrier transmitter with an integrated multiplexer and receiver with an integrated demultiplexer.

BACKGROUND

Optical transceiver modules are used to transmit and receive optical signals for various high-bandwidth data communications applications. An optical transceiver module may include a transmitter optical sub-assembly (TOSA) for transmitting optical signals and a receiver optical sub-assembly (ROSA) for receiving optical signals.

SUMMARY

In some implementations, an optical device includes an optical transmitter and an optical receiver. The optical transmitter may include a first modulation component configured to modulate a first optical carrier signal to generate a first modulation signal and a second modulation signal; a second modulation component configured to modulate a second optical carrier signal, different than the first optical carrier signal, to generate a third modulation signal and a fourth modulation signal; a first polarization beam combiner configured to combine the first modulation signal and the second modulation signal to generate a first transmission signal; a second polarization beam combiner configured to combine the third modulation signal and the fourth modulation signal to generate a second transmission signal; and a multiplexing component configured to generate an output signal by multiplexing the first transmission signal and the second transmission signal. The optical receiver may include a demultiplexing component configured to demultiplex a reception signal into a first reception signal and a second reception signal; a first polarization beam splitter configured to split the first reception signal into a first optical signal and a second optical signal; a second polarization beam splitter configured to split the second reception signal into a third optical signal and a fourth optical signal; a first demodulation component configured to mix the first optical signal and the second optical signal with a first local oscillator signal to demodulate the first optical signal and the second optical signal; and a second demodulation component configured to mix the third optical signal and the fourth optical signal with a second local oscillator signal to demodulate the third optical signal and the fourth optical signal.

In some implementations, an optical transmitter includes a first modulation component configured to modulate a first optical carrier signal, the first modulation component including a first optical modulator to generate a first modulation signal associated with a first polarization of the first optical carrier signal and a second optical modulator to generate a second modulation signal associated with a second polarization of the first optical carrier signal; a second modulation component configured to modulate a second optical carrier signal, the second modulation component including a third optical modulator to generate a third modulation signal associated with the first polarization of the second optical carrier signal and a fourth optical modulator to generate a fourth modulation signal associated with the second polarization of the second optical carrier signal; a first polarization beam combiner configured to combine the first modulation signal and the second modulation signal to generate a first transmission signal; a second polarization beam combiner configured to combine the third modulation signal and the fourth modulation signal to generate a second transmission signal; and a multiplexing component configured to generate an output signal by multiplexing the first transmission signal and the second transmission signal.

In some implementations, an optical receiver includes a demultiplexing component configured to demultiplex a reception signal into a first reception signal and a second reception signal; a first polarization beam splitter configured to split the first reception signal into a first optical signal associated with a first polarization and a second optical signal associated with a second polarization; a second polarization beam splitter configured to split the second reception signal into a third optical signal associated with the first polarization and a fourth optical signal associated with the second polarization; a first demodulation component configured to mix the first optical signal and the second optical signal with a first local oscillator signal to demodulate the first optical signal and the second optical signal; and a second demodulation component configured to mix the third optical signal and the fourth optical signal with a second local oscillator signal to demodulate the third optical signal and the fourth optical signal.

DETAILED DESCRIPTION

Figure 1:
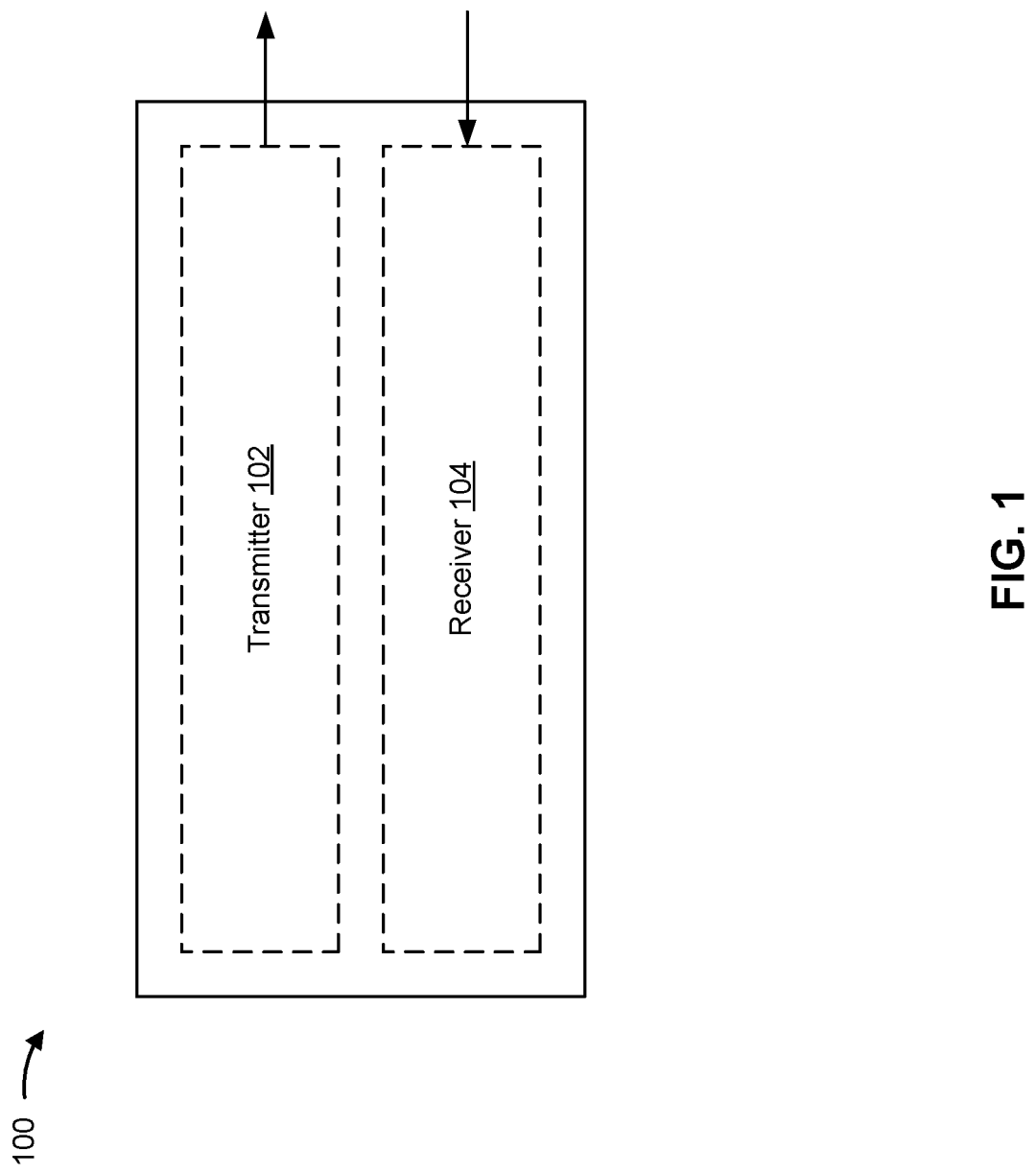
FIG. 1 shows an example optical device.

The following detailed description of example implementations refers to the accompanying drawings. The same reference numbers in different drawings may identify the same or similar elements.

To meet increasing demands for high-speed communication, high-capacity optical transmitters and optical receivers may use an aggregate data rate of 1600 gigabits per second (Gbps) (i.e., 1.6 terabits per second (Tbps)) or higher. This high data rate places high demands on the components of a transmitter and/or a receiver. For example, to achieve the high data rate, a transmitter and/or a receiver may employ a high-data-rate digital signal processor (DSP) (e.g., a 1.6 Tbps DSP), a high driver bandwidth (e.g., greater than 150 gigahertz (GHz)), a high modulator bandwidth, and a low modulator half-wave voltage (Vπ) if single carrier operation is used. Achieving these characteristics is technically difficult and may be costly, even with using advanced chip technology. In addition, the components used to achieve a transmitter and/or a receiver capable of high data rates may be excessively bulky, thereby increasing an overall form factor of an optical module that employs the transmitter and/or the receiver. In some examples, to overcome some of the aforementioned shortcomings, dual carrier operation may be used to achieve a transmitter and/or a receiver capable of high data rates. However, the use of dual carrier operation may have a significant impact on the size of the transmitter and/or the receiver (e.g., because prior components used for multiplexing and/or demultiplexing may be highly complex and large), such that the form factor of such an optical module may be significantly larger relative to modules for single carrier operation.

Some implementations described herein provide a compact, integrated multiplexer for an optical transmitter and a compact, integrated demultiplexer for an optical receiver. The multiplexer may provide combining of dual carrier (or multi-carrier) signals, and the demultiplexer may provide separating of dual carrier (or multi-carrier) signals. In some implementations, a delay line interferometer (DLI), a multimode interferometer (MMI), or a waveguide combiner, among other examples, may be used as a multiplexer in an optical transmitter. In some implementations, a DLI or an MMI, among other examples, may be used as a demultiplexer in an optical receiver. In this way, high data rates may be achieved through dual carrier (or multi-carrier) operation, while a size and a complexity of the transmitter and/or the receiver may be reduced.

Moreover, the transmitter using the integrated multiplexer and/or the receiver using the integrated demultiplexer may be associated with low loss. For example, using a single stage multiplexer/demultiplexer, with a free spectral range (FSR) of 300 gigahertz (GHz) and a dual carrier spacing of 150 GHz, an effective insertion loss associated with the transmitter and/or the receiver (or an optical module that includes the transmitter and the receiver) may be below 0.5 decibels (dB). Furthermore, the multiplexer/demultiplexer may cause a constant group delay across the passband, and therefore there may be no interference to a phase modulated optical signal passing through the multiplexer/demultiplexer.

FIG. 1 shows an example optical device 100. The optical device 100 may correspond to an optical module (e.g., a pluggable optical module), such as an optical transceiver (e.g., a pluggable transceiver), or the like. As shown, the optical device 100 may include an optical transmitter 102 and/or an optical receiver 104. For example, the optical transmitter 102 may include a transmitter optical sub-assembly (TOSA), and the optical receiver 104 may include a receiver optical sub-assembly (ROSA). The optical transmitter 102 may be configured to convert electrical signals into optical signals, and configured to perform transmissions of the optical signals. The optical receiver 104 may be configured to receive transmissions of optical signals, and configured to convert the optical signals into electrical signals. The optical device 100 may be part of an optical communication network, such as a fiber optic network. In some implementations, the optical device 100 may be configured for coherent optical communication. For example, the optical transmitter may be an in-phase (I) and quadrature (Q) phase (IQ) transmitter, as described herein, and the optical receiver 104 may be a coherent receiver, as described herein.

As indicated above, FIG. 1 is provided as an example. Other examples may differ from what is described with regard to FIG. 1.

Figure 2A:
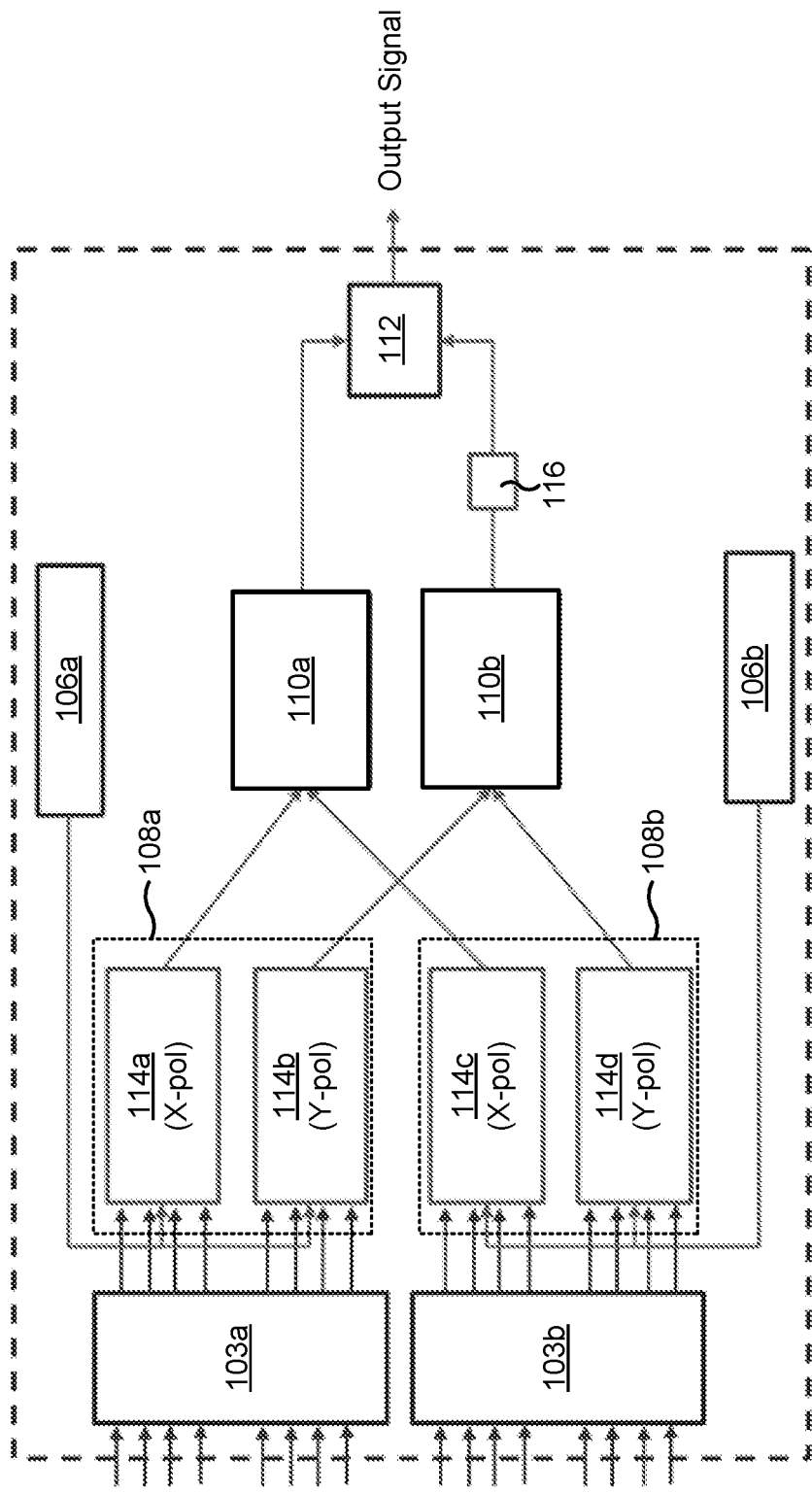
FIG. 2A shows an example optical transmitter.

FIG. 2A shows an example optical transmitter 102. The optical transmitter 102 may be configured for multi-carrier operation, such as dual carrier operation as shown. That is, the optical transmitter 102 may be configured to transmit an optical signal that uses multiple optical carrier signals, such as two optical carrier signals as shown.

The optical transmitter 102 may include multiple driver components 103 (shown as a first driver component 103a and a second driver component 103b), multiple optical carrier signal sources 106 (shown as a first optical carrier signal source 106a and a second optical carrier signal source 106b), multiple modulation components 108 (shown as a first modulation component 108a and a second modulation component 108b), multiple multiplexing components 110 (shown as a first multiplexing component 110a and a second multiplexing component 110b), a polarization rotator 116, and/or a polarization beam combiner 112. These components may be packaged together in an optical transmitter device, such as an optical transmitter module.

The first optical carrier signal source 106a (e.g., a first tunable laser) may be configured to generate a first optical carrier signal. Similarly, the second optical carrier signal source 106b (e.g., a second tunable laser) may be configured to generate a second optical carrier signal (e.g., that is different than the first optical carrier signal). The first optical carrier signal source 106a may be configured to generate the first optical carrier signal at a first frequency, and the second optical carrier signal source 106b may be configured to generate the second optical carrier signal at a second frequency different from the first frequency. That is, the first frequency of the first optical carrier may be different from the second frequency of the second optical carrier. In some implementations, the first frequency of the first optical carrier may have a minimum amount of separation from the second frequency of the second optical carrier, which may be based on a modulation baud rate. In some implementations, the first frequency of the first optical carrier may have a maximum amount of separation from the second frequency of the second optical carrier that is unrestricted.

The first optical carrier signal source 106a may be configured to output the first optical carrier signal to the first modulation component 108a, and the second optical carrier signal source 106b may be configured to output the second optical carrier signal to the second modulation component 108b. The first modulation component 108a may be configured to modulate (e.g., optically modulate) the first optical carrier signal based on a signal (e.g., an electrical signal) from the first driver component 103a (e.g., one or more first driver amplifiers). Similarly, the second modulation component 108b may be configured to modulate (e.g., optically modulate) the second optical carrier signal based on a signal (e.g., an electrical signal) from the second driver component 103b (e.g., one or more second driver amplifiers). The signals from the first driver component 103a and the second driver component 103b may be based on an output from a DSP.

The first modulation component 108a may be configured to modulate the first optical carrier signal to generate a first modulation signal and a second modulation signal. For example, the first modulation component 108*a* may include a first optical modulator 114*a*, configured to generate the first modulation signal using the first optical carrier signal, and a second optical modulator 114*b* configured to generate the second modulation signal using the first optical carrier signal. The first modulation signal may be associated with a first polarization of light (e.g., x-plane, or horizontal, polarization) and the second modulation signal may be associated with a second polarization of light (e.g., y-plane, or vertical, polarization) orthogonal to (e.g., rotated 90 degrees with respect to) the first polarization. That is, the first modulation signal may be intended for transmission using the first polarization, and the second modulation signal may be intended for transmission using the second polarization (even though the first modulation signal and the second modulation signal may have the same polarization at the first optical modulator 114*a* and the second optical modulator 114*b*). In some implementations, the first optical modulator 114*a* and the second optical modulator 114*b* may be IQ modulators. Thus, the first modulation component 108*a* may be a dual polarization (DP) and IQ modulator.

The second modulation component 108*b* may be configured to modulate the second optical carrier signal to generate a third modulation signal and a fourth modulation signal. For example, the second modulation component 108*b* may include a third optical modulator 114*c*, configured to generate the third modulation signal using the second optical carrier signal, and a fourth optical modulator 114*d* configured to generate the fourth modulation signal using the second optical carrier signal. The third modulation signal may be associated with the first polarization and the fourth modulation signal may be associated with the second polarization, in a similar manner as described above. In some implementations, the third optical modulator 114*c* and the fourth optical modulator 114*d* may be IQ modulators. Thus, the second modulation component 108*b* may be a DP and IQ modulator.

The first modulation component 108*a* may be configured to output the first modulation signal, generated by the first optical modulator 114*a*, to the first multiplexing component 110*a* and to output the second modulation signal, generated by the second optical modulator 114*b*, to the second multiplexing component 110*b*. The second modulation component 108*b* may be configured to output the third modulation signal, generated by the third optical modulator 114*c*, to the first multiplexing component 110*a* and to output the fourth modulation signal, generated by the fourth optical modulator 114*d*, to the second multiplexing component 110*b*.

The first multiplexing component 110*a* (e.g., a wavelength multiplexing component) may be configured to generate a first transmission signal by multiplexing (e.g., combining) the first modulation signal and the third modulation signal. That is, the first multiplexing component 110*a* may be configured to multiplex (e.g., wavelength multiplex) the modulation signals associated with the first polarization. For example, the first multiplexing component 110*a* may be configured to receive the first modulation signal and the third modulation signal at respective input ports of the first multiplexing component 110*a* and to output, at an output of the first multiplexing component 110*a*, the first transmission signal based on the first modulation signal and the third modulation signal (e.g., based on a combination of the first modulation signal and the third modulation signal).

The second multiplexing component 110*b* (e.g., a wavelength multiplexing component) may be configured to generate a second transmission signal by multiplexing (e.g., combining) the second modulation signal and the fourth modulation signal. That is, the second multiplexing component 110*b* may be configured to multiplex (e.g., wavelength multiplex) the modulation signals associated with the second polarization. For example, the second multiplexing component 110*b* may be configured to receive the second modulation signal and the fourth modulation signal at respective input ports of the second multiplexing component 110*b* and to output, at an output of the second multiplexing component 110*b*, the second transmission signal based on the second modulation signal and the fourth modulation signal (e.g., based on a combination of the second modulation signal and the fourth modulation signal).

In some implementations, the first multiplexing component 110*a* may include a first DLI (e.g., a first waveguide-based interferometer) and the second multiplexing component 110*b* may include a second DLI (e.g., a second waveguide-based interferometer). The first and second DLIs may be Mach-Zehnder interferometers and/or Michelson interferometers, among other examples. The first and second DLIs may each be tunable as to phase delay to provide fine tuning of frequencies of the DLIs. Because the first and second DLIs may be waveguide-based (e.g., using InP waveguides), the first and second DLIs may be directly integrated into the optical transmitter 102 (e.g., that is based on an InP or silicon chip). In some implementations, the first multiplexing component 110*a* may include a first MMI and the second multiplexing component 110*b* may include a second MMI. In some implementations, the first multiplexing component 110*a* may include a first waveguide combiner (e.g., a waveguide-based beam combiner) and the second multiplexing component 110*b* may include a second waveguide combiner (e.g., a waveguide-based beam combiner). In this way, the optical transmitter 102 may have integrated multiplexers that are compact, thereby facilitating miniaturization of the optical transmitter 102.

The polarization beam combiner 112 may be configured to combine the first transmission signal, output by the first multiplexing component 110*a*, and the second transmission signal, output by the second multiplexing component 110*b*, for transmission by the optical transmitter 102. As described herein, the first transmission signal may be associated with the first polarization, and the second transmission signal may be associated with the second polarization. Accordingly, the optical transmitter 102 may include the polarization rotator 116, at an output of the second multiplexing component 110*b* (or the first multiplexing component 110*a*), configured to rotate (e.g., by 90 degrees) a polarization of the second transmission signal (or the first transmission signal) to the second polarization. For example, the polarization rotator 116 may be in a path between the second multiplexing component 110*b* and the polarization beam combiner 112, as shown. Thus, the polarization beam combiner 112 may combine the first transmission signal, having the first polarization, and the second transmission signal, having the second polarization, into an output signal. In some implementations, the polarization rotator 116 and the polarization beam combiner 112 may be a single component (e.g., a polarization beam rotator and combiner).

In some implementations, a method of multi-carrier communication may be performed using the optical transmitter 102. The method may include generating a first optical carrier signal and a second optical carrier signal, as described herein. The method may include modulating the first optical carrier signal to generate a first modulation signal associated with a first polarization and to generate a second modulation signal associated with a second polarization, as described herein. The method may include modulating the second optical carrier signal to generate a third modulation signal associated with the first polarization and to generate a fourth modulation signal associated with the second polarization, as described herein. The method may include generating a first transmission signal by multiplexing the first modulation signal and the third modulation signal, as described herein. The method may include generating a second transmission signal by multiplexing the second modulation signal and the fourth modulation signal, as described herein. The method may include combining the first transmission signal and the second transmission signal to generate an output signal for transmission, as described herein. The method may include transmitting the output signal.

As indicated above, FIG. 2A is provided as an example. Other examples may differ from what is described with regard to FIG. 2A.

Figure 2B:
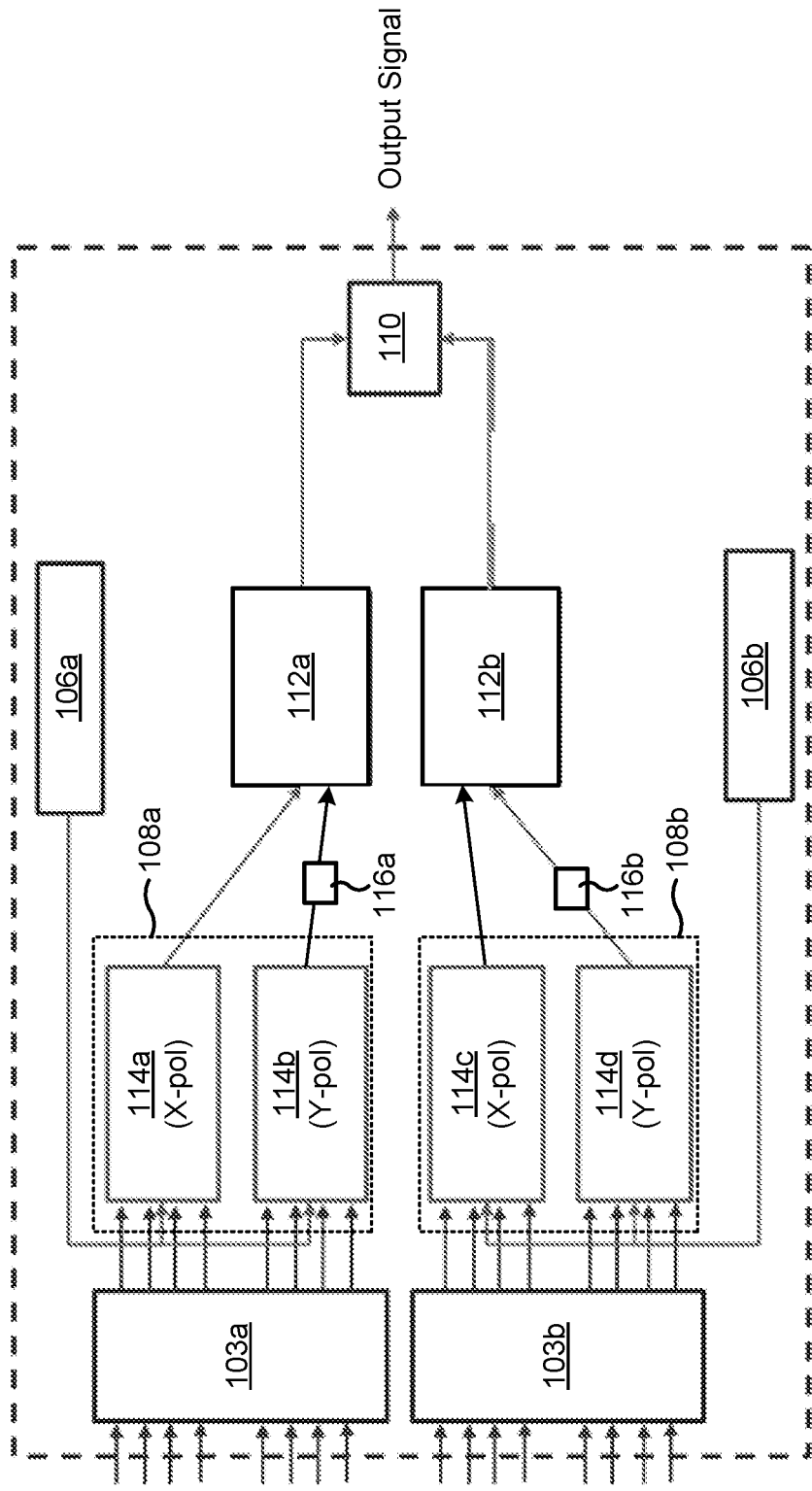
FIG. 2B shows an example optical transmitter.

FIG. 2B shows an example optical transmitter 102, which may be an alternative to that described in connection with FIG. 2A. The optical transmitter 102 may be configured for multi-carrier operation, such as dual carrier operation as shown. That is, the optical transmitter 102 may be configured to transmit an optical signal that uses multiple optical carrier signals, such as two optical carrier signals as shown.

The optical transmitter 102 may include multiple driver components 103 (shown as a first driver component 103a and a second driver component 103b), multiple optical carrier signal sources 106 (shown as a first optical carrier signal source 106a and a second optical carrier signal source 106b), multiple modulation components 108 (shown as a first modulation component 108a and a second modulation component 108b), a multiplexing component 110, multiple polarization rotators 116 (shown as a first polarization rotator 116a and a second polarization rotator 116b), and/or multiple polarization beam combiners 112 (shown as a first polarization beam combiner 112a and a second polarization beam combiner 112b). Unless otherwise noted, these components may be configured and may operate in a similar manner as described in connection with FIG. 2A. These components may be packaged together in an optical transmitter device, such as an optical transmitter module.

The first modulation component 108a may be configured to modulate the first optical carrier signal to generate a first modulation signal and a second modulation signal. For example, the first modulation component 108a may include a first optical modulator 114a, configured to generate the first modulation signal using the first optical carrier signal, and a second optical modulator 114b configured to generate the second modulation signal using the first optical carrier signal. The first modulation signal may be associated with a first polarization of light (e.g., x-plane, or horizontal, polarization) and the second modulation signal may be associated with a second polarization of light (e.g., y-plane, or vertical, polarization) orthogonal to (e.g., rotated 90 degrees with respect to) the first polarization. That is, the first modulation signal may be intended for transmission using the first polarization, and the second modulation signal may be intended for transmission using the second polarization (even though the first modulation signal and the second modulation signal may have the same polarization at the first optical modulator 114a and the second optical modulator 114b). In some implementations, the first polarization rotator 116a may be located at an output of the second optical modulator 114b (or the first optical modulator 114a), and the first polarization rotator 116a may be configured to rotate a polarization of the second modulation signal (or the first modulation signal) by 90 degrees (e.g., to the second polarization). In some implementations, the first optical modulator 114a and the second optical modulator 114b may be IQ modulators. Thus, the first modulation component 108a may be a DP and IQ modulator.

The second modulation component 108b may be configured to modulate the second optical carrier signal to generate a third modulation signal and a fourth modulation signal. For example, the second modulation component 108b may include a third optical modulator 114c, configured to generate the third modulation signal using the second optical carrier signal, and a fourth optical modulator 114d configured to generate the fourth modulation signal using the second optical carrier signal. The third modulation signal may be associated with the first polarization and the fourth modulation signal may be associated with the second polarization, in a similar manner as described above. In some implementations, the second polarization rotator 116b may be located at an output of the fourth optical modulator 114d (or the third optical modulator 114c), and the second polarization rotator 116b may be configured to rotate a polarization of the fourth modulation signal (or the third modulation signal) by 90 degrees (e.g., to the second polarization). In some implementations, the third optical modulator 114c and the fourth optical modulator 114d may be IQ modulators. Thus, the second modulation component 108b may be a DP and IQ modulator.

The first modulation component 108a may be configured to output the first modulation signal and the second modulation signal, generated by the first optical modulator 114a and the second optical modulator 114b, respectively, to the first polarization beam combiner 112a. The first polarization beam combiner 112a may be configured to combine the first modulation signal (e.g., in the first polarization) and the second modulation signal (e.g., in the second polarization) to generate a first transmission signal. The second modulation component 108b may be configured to output the third modulation signal and the fourth modulation signal, generated by the third optical modulator 114c and the fourth optical modulator 114d, respectively, to the second polarization beam combiner 112b. The second polarization beam combiner 112b may be configured to combine the third modulation signal (e.g., in the first polarization) and the fourth modulation signal (e.g., in the second polarization) to generate a second transmission signal.

The first polarization beam combiner 112a may be configured to output the first transmission signal, and the second polarization beam combiner 112b may be configured to output the second transmission signal, to the multiplexing component 110. The multiplexing component 110 may be configured to generate an output signal, for transmission by the optical transmitter 102, by multiplexing the first transmission signal and the second transmission signal. In some implementations, the multiplexing component 110 may be polarization independent. In some implementations, the multiplexing component 110 may be a DLI, an MMI, or a waveguide combiner, as described herein.

In some implementations, a method of multi-carrier communication may be performed using the optical transmitter 102. The method may include generating a first optical carrier signal and a second optical carrier signal, as described herein. The method may include modulating the first optical carrier signal to generate a first modulation signal associated with a first polarization and to generate a second modulation signal associated with a second polarization, as described herein. The method may include modulating the second optical carrier signal to generate a third modulation signal associated with the first polarization and to generate a fourth modulation signal associated with the second polarization, as described herein. The method may include generating a first transmission signal by combining the first modulation signal and the second modulation signal, as described herein. The method may include generating a second transmission signal by combining the third modulation signal and the fourth modulation signal, as described herein. The method may include generating an output signal by multiplexing the first transmission signal and the second transmission signal, as described herein. The method may include transmitting the output signal.

As indicated above, FIG. 2B is provided as an example. Other examples may differ from what is described with regard to FIG. 2B.

Figure 3A:
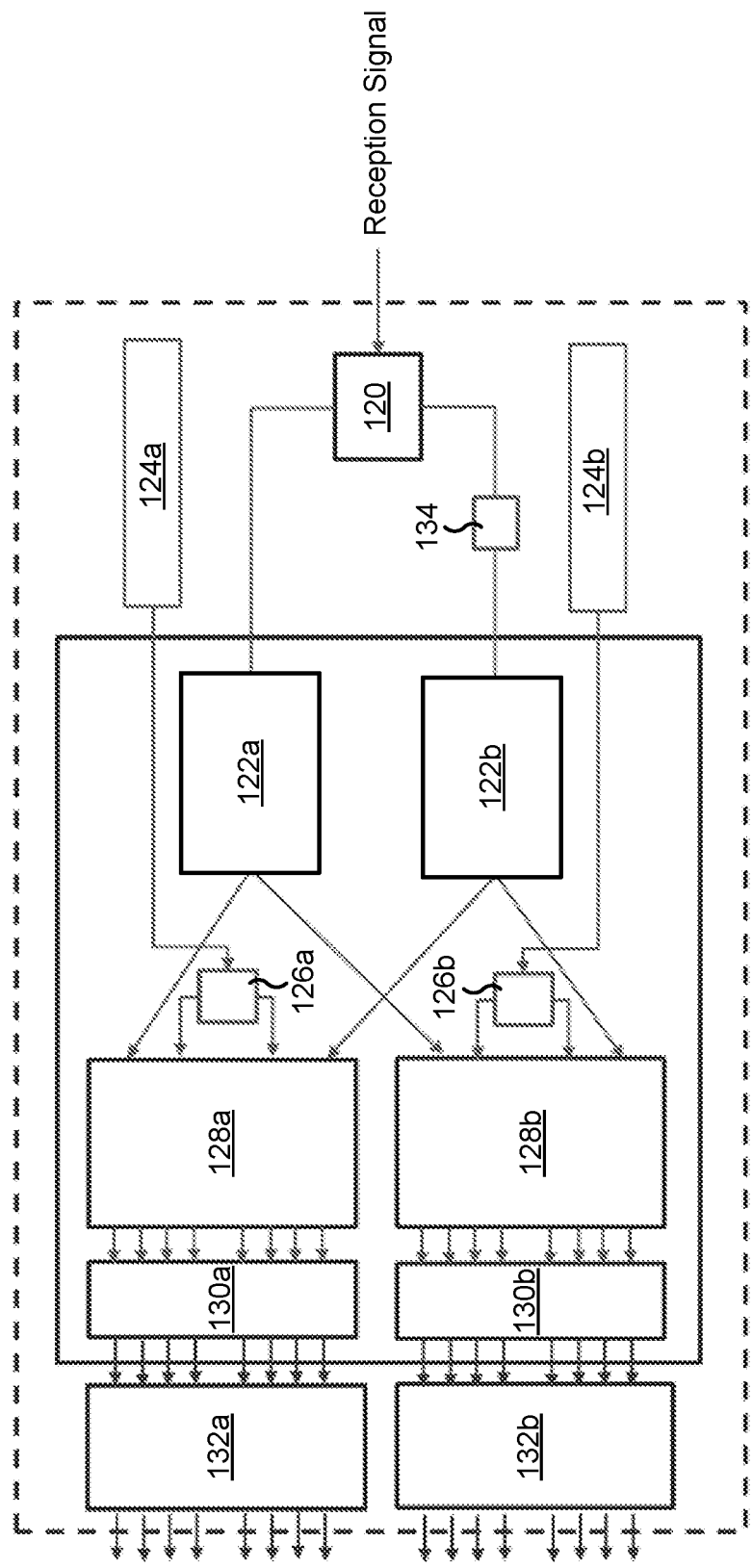
FIG. 3A shows an example optical receiver.

FIG. 3A shows an example optical receiver 104. The optical receiver 104 may be configured for multi-carrier operation, such as dual carrier operation as shown. That is, the optical receiver 104 may be configured to receive an optical signal that uses multiple optical carrier signals, such as two optical carrier signals as shown. The optical receiver 104 may be a coherent optical receiver.

The optical receiver 104 may include a polarization beam splitter 120, a polarization rotator 134, multiple demultiplexing components 122 (shown as a first demultiplexing component 122a and a second demultiplexing component 122b), multiple local oscillator signal sources 124 (shown as a first local oscillator signal source 124a and a second local oscillator signal source 124b), multiple beam splitters 126 (shown as a first beam splitter 126a and a second beam splitter 126b), multiple demodulation components 128 (shown as a first demodulation component 128a and a second demodulation component 128b), multiple photodiode arrays 130 (shown as a first photodiode array 130a and a second photodiode array 130b), and/or multiple transimpedance amplifier (TIA) arrays 132 (shown as a first TIA array 132a and a second TIA array 132b). These components may be packaged together in an optical receiver device, such as an optical receiver module.

The polarization beam splitter 120 may be configured to split a reception signal, received at the optical receiver 104, into a first polarization reception signal and a second polarization reception signal. The polarization beam splitter 120 may split the reception signal by the first polarization and the second polarization. Accordingly, the first polarization reception signal may have the first polarization and the second polarization reception signal may have the second polarization. In some implementations, the optical receiver 104 may include the polarization rotator 134 at one output of the polarization beam splitter 120 (e.g., to cause the first polarization reception signal and the second polarization reception signal to have the same polarization as that of the local oscillator signal sources 124a, 124b). For example, the polarization rotator 134 may be in a path between the polarization beam splitter 120 and the second demultiplexing component 122b (or the first demultiplexing component 122a), such that optical beams entering the first demultiplexing component 122a and the second demultiplexing component 122b are in the same polarization as that of the local oscillator signal sources 124a, 124b respectively. The polarization beam splitter 120 may be configured to output the first polarization reception signal to the first demultiplexing component 122a and to output the second polarization reception signal to the second demultiplexing component 122b. In some implementations, the polarization rotator 134 and the polarization beam splitter 120 may be a single component (e.g., a polarization beam splitter and rotator).

The first demultiplexing component 122a (e.g., a wavelength demultiplexing component) may be configured to demultiplex (e.g., separate) the first polarization reception signal into a first optical signal and a second optical signal. The first demultiplexing component 122a may be configured to receive the first polarization reception signal at an input port of the first demultiplexing component 122a and to output the first optical signal and the second optical signal at respective output ports of the first demultiplexing component 122a (e.g., based on a separation of the first optical signal from the second optical signal). The first optical signal and the second optical signal may be associated with the first polarization. That is, the first optical signal and the second optical signal may have been received at the optical receiver 104 in the first polarization.

The second demultiplexing component 122b (e.g., a wavelength demultiplexing component) may be configured to demultiplex (e.g., separate) the second polarization reception signal into a third optical signal and a fourth optical signal. The second demultiplexing component 122b may be configured to receive the second polarization reception signal at an input port of the second demultiplexing component 122b and to output the third optical signal and the fourth optical signal at respective output ports of the second demultiplexing component 122b (e.g., based on a separation of the third optical signal from the fourth optical signal). The third optical signal and the fourth optical signal may be associated with the second polarization. That is, the third optical signal and the fourth optical signal may have been received at the optical receiver 104 in the second polarization, but may have had their polarizations rotated (e.g., to the first polarization) at the polarization rotator 134.

In some implementations, the first demultiplexing component 122a may include a first DLI (e.g., a first waveguide-based interferometer) and the second demultiplexing component 122b may include a second DLI (e.g., a second waveguide-based interferometer), in a similar manner as described in connection with FIG. 2. For example, because the first and second DLIs may be waveguide-based (e.g., using InP waveguides), the first and second DLIs may be directly integrated into the optical receiver 104 (e.g., that is based on an InP, silica, or silicon chip). In some implementations, the first demultiplexing component 122a may include a first MMI and the second demultiplexing component 122b may include a second MMI. In this way, the optical receiver 104 may have integrated demultiplexers that are compact, thereby facilitating miniaturization of the optical receiver 104.

The first local oscillator signal source 124a (e.g., a first tunable laser) may be configured to generate a first local oscillator signal. Similarly, the second local oscillator signal source 124b (e.g., a second tunable laser) may be configured to generate a second local oscillator signal. The first local oscillator signal source 124a may be configured to generate the first local oscillator signal at a first frequency, and the second local oscillator signal source 124b may be configured to generate the second local oscillator signal at a second frequency different from the first frequency. That is, the first frequency of the first local oscillator signal may be different from the second frequency of the second local oscillator signal.

In some implementations, the first frequency of the first local oscillator signal may correspond to (e.g., may be the same as, or nearly the same as, such as within 0-5 GHz) the first frequency of the first optical carrier signal, and the second frequency of the second local oscillator signal may correspond to (e.g., may be the same as, or nearly the same as, such as within 0-5 GHz) the second frequency of the first optical carrier signal. That is, the first local oscillator signal source 124a and the first optical carrier signal source 106a may be configured to generate signals that correspond in frequency, and the second local oscillator signal source 124b and the second optical carrier signal source 106b may be configured to generate signals that correspond in frequency. In some implementations, the first local oscillator signal source 124a may be the first optical carrier signal source 106a (e.g., by tapping off a portion of an output of the first optical carrier signal source 106a) and/or the second local oscillator signal source 124b may be the second optical carrier signal source 106b (e.g., by tapping off a portion of an output of the second optical carrier signal source 106b). That is, signal sources may be shared by the optical transmitter 102 and the optical receiver 104.

The first local oscillator signal source 124a may be configured to output the first local oscillator signal to the first demodulation component 128a via the first beam splitter 126a. Similarly, the second local oscillator signal source 124b may be configured to output the second local oscillator signal to the second demodulation component 128b via the second beam splitter 126b. In addition, the first demultiplexing component 122a may be configured to output the first optical signal to the first demodulation component 128a and to output the second optical signal to the second demodulation component 128b. Similarly, the second demultiplexing component 122b may be configured to output the third optical signal to the first demodulation component 128a and to output the fourth optical signal to the second demodulation component 128b.

The first demodulation component 128a may be configured to mix the first optical signal with the first local oscillator signal and to mix the third optical signal with the first local oscillator signal to demodulate the first optical signal and the third optical signal (e.g., to provide a demodulated signal from which a signal processor may recover data from the first optical signal and the third optical signal). Similarly, the second demodulation component 128b may be configured to mix the second optical signal with the second local oscillator signal and to mix the fourth optical signal with the second local oscillator signal to demodulate the second optical signal and the fourth optical signal (e.g., to provide a demodulated signal from which a signal processor may recover data from the second optical signal and the fourth optical signal). In some implementations, the first demodulation component 128a and/or the second demodulation component 128b may include respective optical hybrid mixers (e.g., 90° optical hybrid mixers). For example, the first demodulation component 128a may include a first optical hybrid mixer associated with the first polarization, and the second demodulation component 128b may include a second optical hybrid mixer associated with the second polarization.

The first demodulation component 128a may be configured to output demodulated signals (e.g., resulting from demodulation of the first optical signal and the third optical signal) to the first photodiode array 130a, and the first photodiode array 130a may output electrical signals derived from the demodulated signals to the first TIA array 132a. Similarly, the second demodulation component 128b may be configured to output demodulated signals (e.g., resulting from demodulation of the second optical signal and the fourth optical signal) to the second photodiode array 130b, and the second photodiode array 130b may output electrical signals derived from the demodulated signals to the second TIA array 132b. In some implementations, the first TIA array 132a and the second TIA array 132b may be configured to output signals to a DSP for processing.

In some implementations, a method of multi-carrier communication may be performed using the optical receiver 104. The method may include receiving a reception signal. The method may include splitting the reception signal into a first polarization reception signal and a second polarization reception signal, as described herein. The method may include demultiplexing the first polarization reception signal into a first optical signal and a second optical signal associated with a first polarization, as described herein. The method may include demultiplexing the second polarization reception signal into a third optical signal and a fourth optical signal associated with a second polarization, as described herein. The method may include generating a first local oscillator signal and a second local oscillator signal, as described herein. The method may include demodulating the first optical signal and the third optical signal by mixing the first optical signal and the third optical signal with the first local oscillator signal, as described herein. The method may include demodulating the second optical signal and the fourth optical signal by mixing the second optical signal and the fourth optical signal with the second local oscillator signal, as described herein.

As indicated above, FIG. 3A is provided as an example. Other examples may differ from what is described with regard to FIG. 3A.

Figure 3B:
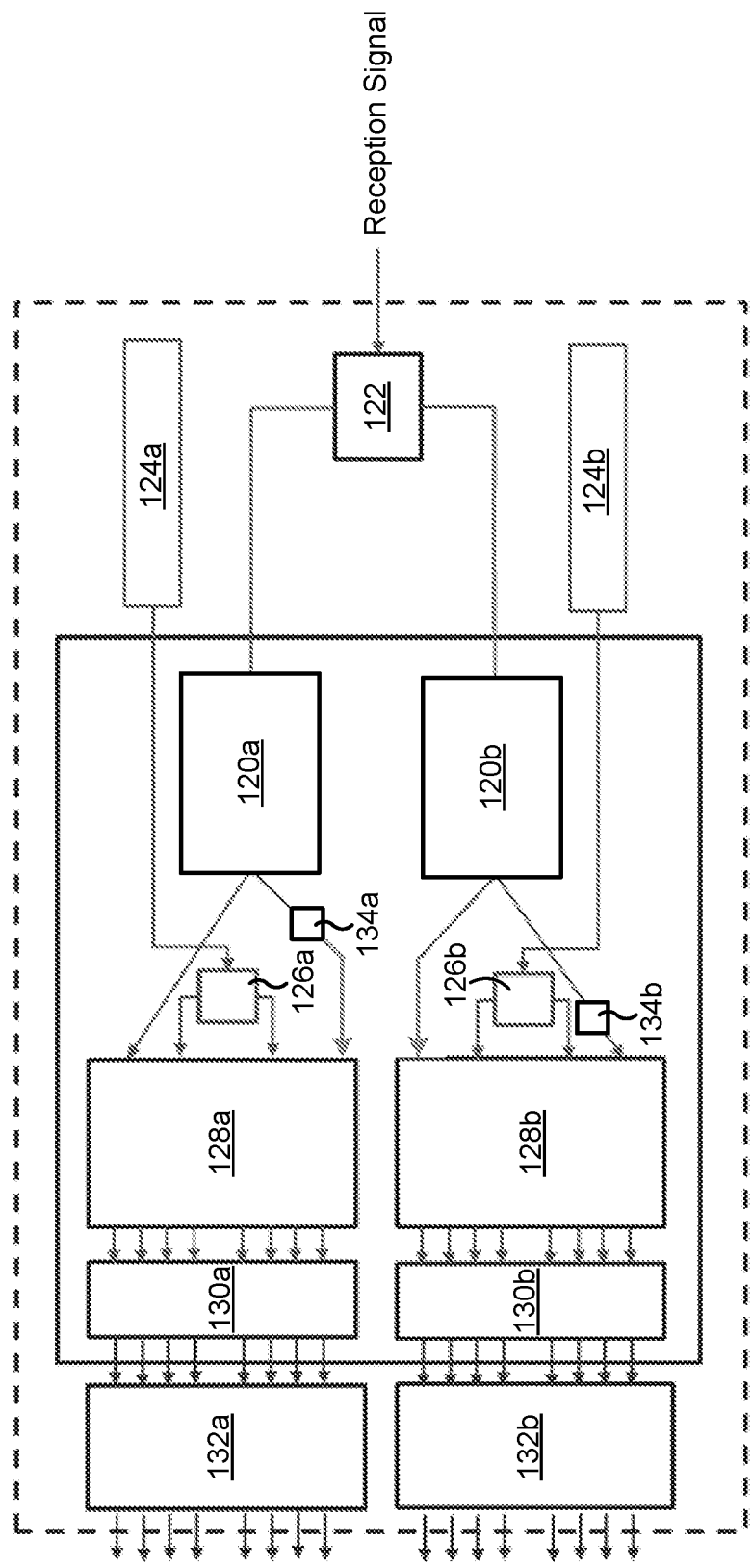
FIG. 3B shows an example optical receiver.

FIG. 3B shows an example optical receiver 104, which may be an alternative to that described in connection with FIG. 3A. The optical receiver 104 may be configured for multi-carrier operation, such as dual carrier operation as shown. That is, the optical receiver 104 may be configured to receive an optical signal that uses multiple optical carrier signals, such as two optical carrier signals as shown. The optical receiver 104 may be a coherent optical receiver.

The optical receiver 104 may include multiple polarization beam splitters 120 (shown as a first polarization beam splitter 120a and a second polarization beam splitter 120b), multiple polarization rotators 134 (shown as a first polarization rotator 134a and a second polarization rotator 134b), a demultiplexing component 122, multiple local oscillator signal sources 124 (shown as a first local oscillator signal source 124a and a second local oscillator signal source 124b), multiple beam splitters 126 (shown as a first beam splitter 126a and a second beam splitter 126b), multiple demodulation components 128 (shown as a first demodulation component 128a and a second demodulation component 128b), multiple photodiode arrays 130 (shown as a first photodiode array 130a and a second photodiode array 130b), and/or multiple TIA arrays 132 (shown as a first TIA array 132a and a second TIA array 132b). Unless otherwise noted, these components may be configured and may operate in a similar manner as described in connection with FIG. 3A. These components may be packaged together in an optical receiver device, such as an optical receiver module.

The demultiplexing component 122 may be configured to demultiplex a reception signal, received at the optical receiver 104, into a first reception signal and a second reception signal. In some implementations, the demultiplexing component 122 may be polarization independent. In some implementations, the demultiplexing component 122 may be a DLI or an MMI.

The demultiplexing component 122 may be configured to output the first reception signal to the first polarization beam splitter 120a. The first polarization beam splitter 120a may be configured to split the first reception signal into a first optical signal and a second optical signal. The first polarization beam splitter 120a may split the first reception signal by the first polarization and the second polarization. Accordingly, the first optical signal may have the first polarization and the second optical signal may have the second polarization. In some implementations, the first polarization rotator 134a may be located at one output of the first polarization beam splitter 120a (e.g., to cause the first optical signal and the second optical signal to have the same polarization as that of the first local oscillator signal source 124a). For example, the first polarization rotator 134a may be configured to rotate a polarization of the second optical signal, output by the first polarization beam splitter 120a, by 90 degrees (e.g., to the first polarization).

The demultiplexing component 122 may be configured to output the second reception signal to the second polarization beam splitter 120b. The second polarization beam splitter 120b may be configured to split the second reception signal into a third optical signal and a fourth optical signal. The second polarization beam splitter 120b may split the second reception signal by the first polarization and the second polarization. Accordingly, the third optical signal may have the first polarization and the fourth optical signal may have the second polarization. In some implementations, the second polarization rotator 134b may be located at one output of the second polarization beam splitter 120b (e.g., to cause the third optical signal and the fourth optical signal to have the same polarization as that of the second local oscillator signal source 124b). For example, the second polarization rotator 134b may be configured to rotate a polarization of the fourth optical signal, output by the second polarization beam splitter 120b, by 90 degrees (e.g., to the first polarization).

The first polarization beam splitter 120a may be configured to output the first optical signal and the second optical signal to the first demodulation component 128a. The second polarization beam splitter 120b may be configured to output the third optical signal and the fourth optical signal to the second demodulation component 128b. The first demodulation component 128a may be configured to mix the first optical signal with a first local oscillator signal, generated by the first local oscillator signal source 124a, and to mix the second optical signal with the first local oscillator signal to demodulate the first optical signal and the second optical signal (e.g., to provide a demodulated signal from which a signal processor may recover data from the first optical signal and the second optical signal). Similarly, the second demodulation component 128b may be configured to mix the third optical signal with a second local oscillator signal, generated by the second local oscillator signal source 124b, and to mix the fourth optical signal with the second local oscillator signal to demodulate the third optical signal and the fourth optical signal (e.g., to provide a demodulated signal from which a signal processor may recover data from the third optical signal and the fourth optical signal).

In some implementations, a method of multi-carrier communication may be performed using the optical receiver 104. The method may include receiving a reception signal. The method may include demultiplexing the reception signal into a first reception signal and a second reception signal, as described herein. The method may include splitting the first reception signal into a first optical signal associated with a first polarization and a second optical signal associated with a second polarization, as described herein. The method may include splitting the second reception signal into a third optical signal associated with the first polarization and a fourth optical signal associated with the second polarization, as described herein. The method may include generating a first local oscillator signal and a second local oscillator signal, as described herein. The method may include demodulating the first optical signal and the second optical signal by mixing the first optical signal and the second optical signal with the first local oscillator signal, as described herein. The method may include demodulating the third optical signal and the fourth optical signal by mixing the third optical signal and the fourth optical signal with the second local oscillator signal, as described herein.

As indicated above, FIG. 3B is provided as an example. Other examples may differ from what is described with regard to FIG. 3B.

Figure 4:
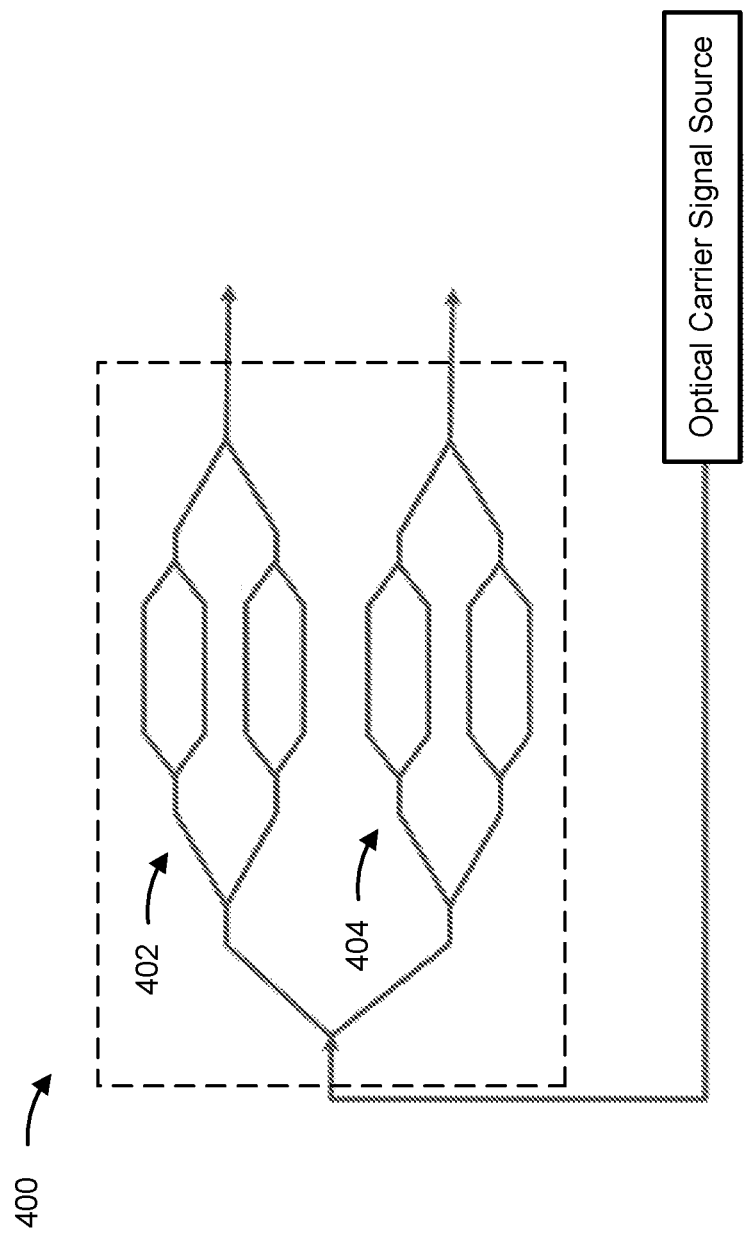
FIG. 4 shows an example modulation component.

FIG. 4 shows an example modulation component 400. For example, a modulation component 108 (as described in connection with FIG. 2A or FIG. 2B) may correspond to the modulation component 400. As shown, the modulation component 400 may include a first optical modulator 402 (e.g., that includes multiple nested optical modulators, such as Mach-Zehnder modulators (MZMs)) and a second optical modulator 404 (e.g., that includes multiple nested optical modulators, such as MZMs). The first optical modulator 402 may be configured to perform IQ modulation of signals associated with the first polarization, and the second optical modulator 404 may be configured to perform IQ modulation of signals associated with the second polarization. In some implementations, the modulation component 400 may output a DP quadrature phase shift keying (QPSK) signal.

As indicated above, FIG. 4 is provided as an example. Other examples may differ from what is described with regard to FIG. 4.

Figure 5:
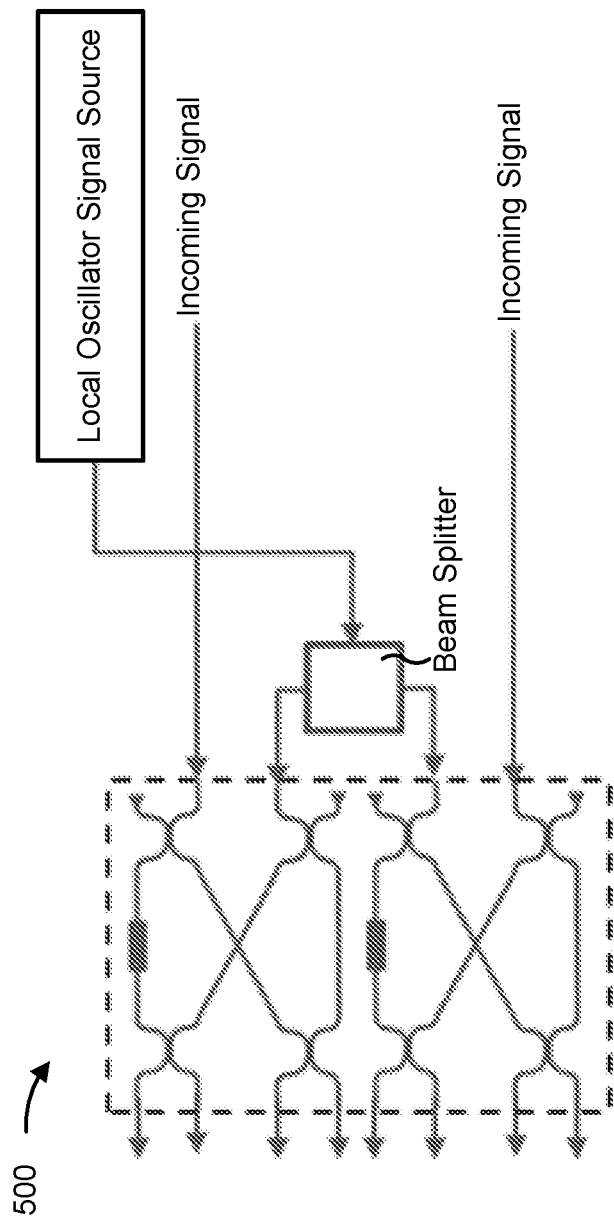
FIG. 5 shows an example demodulation component.

FIG. 5 shows an example demodulation component 500. For example, a demodulation component 128 (as described in connection with FIG. 3A or FIG. 3B) may correspond to the demodulation component 500. The demodulation component 500 may include optical hybrid mixers (e.g., 90° optical hybrid mixers), as shown. The demodulation component 500 may be configured to provide coherent signal demodulation. For example, as shown, the demodulation component 500 may be configured to mix a local oscillator signal with one or more incoming signals, as described herein.

As indicated above, FIG. 5 is provided as an example. Other examples may differ from what is described with regard to FIG. 5.

Figure 6:
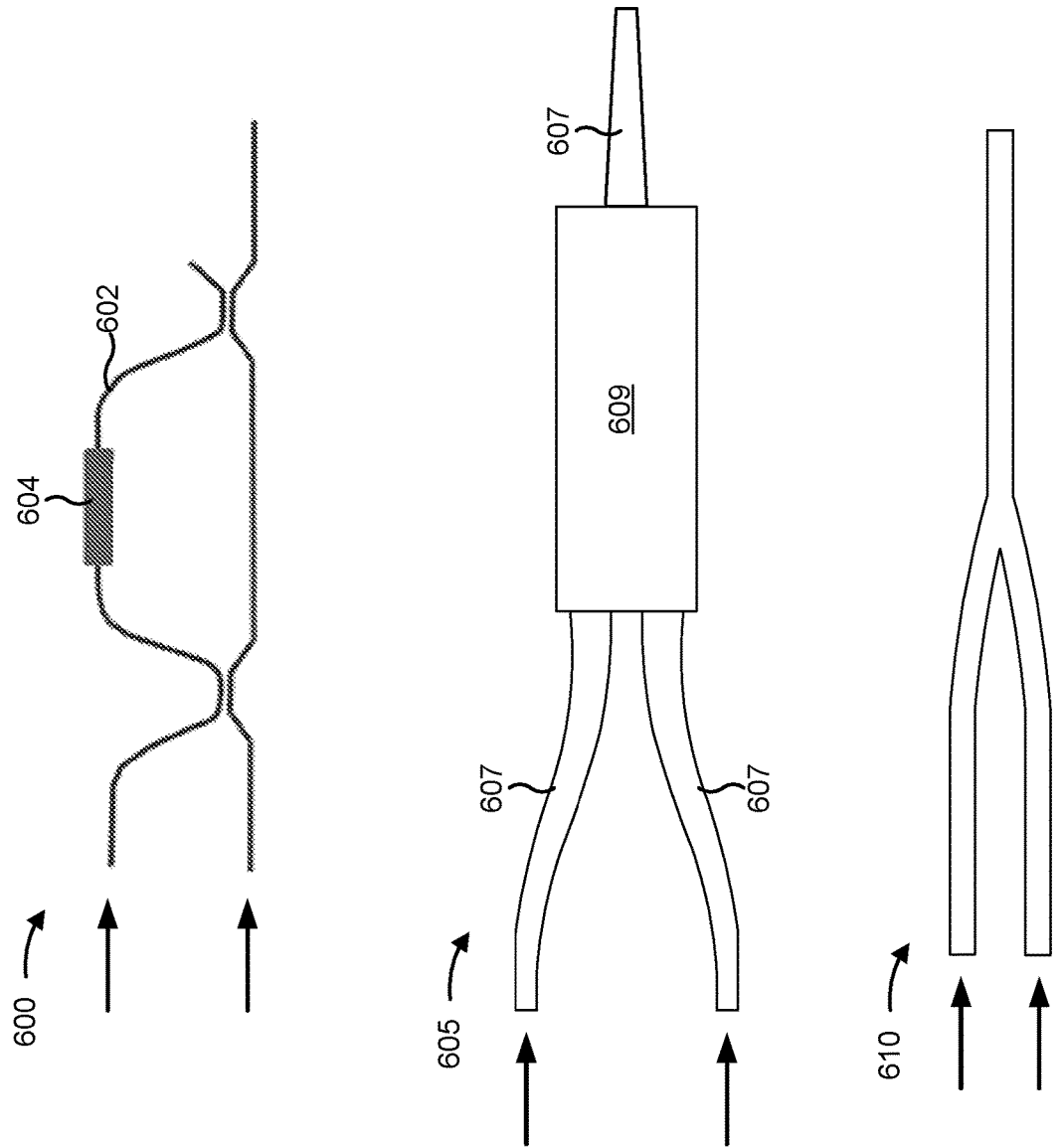
FIG. 6 shows example multiplexing or demultiplexing components.

FIG. 6 shows example multiplexing or demultiplexing components 600, 605, 610. For example, a multiplexing component 110 (as described in connection with FIG. 2A or FIG. 2B) may correspond to multiplexing components 600, 605, or 610. As another example, a demultiplexing component 122 (as described in connection with FIG. 3A or FIG. 3B) may correspond to demultiplexing components 600 or 605.

Multiplexing or demultiplexing component 600 may include a DLI. The DLI may be a Mach-Zehnder interferometer and/or a Michelson interferometer, among other examples. The DLI may be an optical waveguide device. The DLI may be tunable as to phase delay. For example, a delay line arm 602 of the DLI may include a tuning element 604 (e.g., a heating element) to enable tuning of a phase delay of the DLI. In some implementations, the DLI may have an FSR of 300 GHz. Here, a length difference of the delay line arm 602 of the DLI may be approximately 300 micrometers (μm). For multiplexing, respective input signals may be input to the DLI, combined, and an output signal based on the input signals may be output from the DLI, in a direction of the arrows shown. For demultiplexing, an input signal may be input to the DLI, separated, and respective output signals based on the input signal may be output from the DLI, in an opposite direction of the arrows shown.

Multiplexing or demultiplexing component 605 may include an MMI. The MMI may include waveguides 607 for entrance and exit paths to an MMI section 609. For multiplexing, respective input signals may be input to the MMI, combined, and an output signal based on the input signals may be output from the MMI, in a direction of the arrows shown. For demultiplexing, an input signal may be input to the MMI, separated, and respective output signals based on the input signal may be output from the MMI, in an opposite direction of the arrows shown.

Multiplexing component 610 may include a waveguide combiner. The waveguide combiner may be an optical waveguide device. For multiplexing, respective input signals may be input to the waveguide combiner, combined, and an output signal based on the input signals may be output from the waveguide combiner, in a direction of the arrows shown.

As indicated above, FIG. 6 is provided as an example. Other examples may differ from what is described with regard to FIG. 6.

Figure 7:
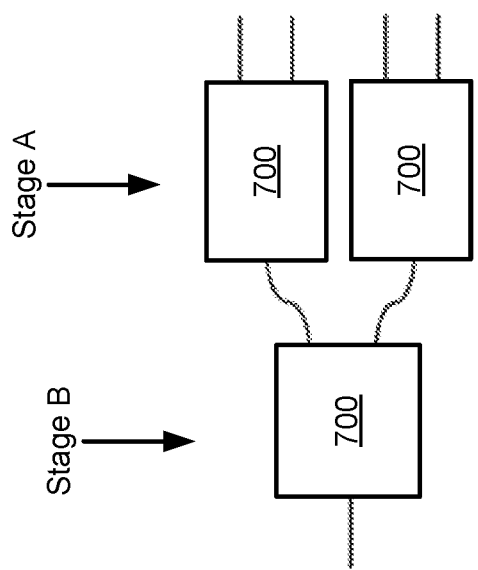
FIG. 7 shows an example of multiplexing or demultiplexing component nesting.

FIG. 7 shows an example of multiplexing or demultiplexing component nesting. As shown, multiple multiplexing or demultiplexing components 700 may be nested (e.g., cascaded) to support multi-carrier operation (e.g., using more than two carriers). The multiplexing or demultiplexing components 700 may correspond to the multiplexing components 600, 605, and/or 610 or demultiplexing components 600 and/or 605. As shown, the multiplexing or demultiplexing components 700 may be configured in two stages to support multi-carrier operation with four carriers. That is, the nested multiplexing or demultiplexing components 700, as shown, may provide 4×1 multiplexing or 1×4 demultiplexing. In some implementations, when a DLI 600 or an MMI 605 is used, an FSR of a multiplexing or demultiplexing component 700 that is alone in a stage may be double that of the FSRs of multiplexing or demultiplexing components 700 that share a stage. For example, the multiplexing or demultiplexing components 700 in Stage A may each have an FSR of 300 GHz, and the multiplexing or demultiplexing component 700 in Stage B may have an FSR of 600 GHz. Multiplexing or demultiplexing components 700 may be nested into any quantity m of stages (where m is an integer greater than 0) to achieve N×1 multiplexing or 1×N demultiplexing (where N=$2^m$).

As indicated above, FIG. 7 is provided as an example. Other examples may differ from what is described with regard to FIG. 7.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical device, comprising:
    an optical transmitter, comprising:
        a first modulation component configured to modulate a first optical carrier signal to generate a first modulation signal and a second modulation signal;
        a second modulation component configured to modulate a second optical carrier signal, different than the first optical carrier signal, to generate a third modulation signal and a fourth modulation signal;
        a first polarization beam combiner configured to combine the first modulation signal and the second modulation signal to generate a first transmission signal;
        a second polarization beam combiner configured to combine the third modulation signal and the fourth modulation signal to generate a second transmission signal; and
        a multiplexing component integrated into the optical transmitter and configured to generate an output signal by multiplexing the first transmission signal and the second transmission signal, wherein the multiplexing component includes a first tuning element configured to enable tuning of a first phase delay of the multiplexing component to maintain an effective insertion loss associated with the optical transmitter below 0.5 decibels (dB); and an optical receiver, comprising:
- a demultiplexing component integrated into the optical receiver and configured to demultiplex a reception signal into a first reception signal and a second reception signal, wherein the demultiplexing component includes a second tuning element configured to enable tuning of a second phase delay of the demultiplexing component to maintain an effective insertion loss associated with the optical receiver below 0.5 dB;
- a first polarization beam splitter configured to split the first reception signal into a first optical signal and a second optical signal;
- a second polarization beam splitter configured to split the second reception signal into a third optical signal and a fourth optical signal;
- a first demodulation component configured to mix the first optical signal and the second optical signal with a first local oscillator signal to demodulate the first optical signal and the second optical signal; and
- a second demodulation component configured to mix the third optical signal and the fourth optical signal with a second local oscillator signal to demodulate the third optical signal and the fourth optical signal.

2. The optical device of claim 1, further comprising:
a first polarization rotator configured to rotate a polarization of the second modulation signal by 90 degrees, and a second polarization rotator configured to rotate a polarization of the fourth modulation signal by 90 degrees.

3. The optical device of claim 1, further comprising:
a first polarization rotator configured to rotate a polarization of the second optical signal by 90 degrees, and a second polarization rotator configured to rotate a polarization of the fourth optical signal by 90 degrees.

4. The optical device of claim 1, wherein the multiplexing component is polarization independent.

5. The optical device of claim 1, wherein the demultiplexing component is polarization independent.

6. The optical device of claim 1, wherein the multiplexing component comprises a first delay line interferometer (DLI), and the demultiplexing component comprises a second DLI.

7. The optical device of claim 1, wherein the multiplexing component comprises a first multimode interferometer (MMI), and the demultiplexing component comprises a second MMI.

8. The optical device of claim 1, wherein the multiplexing component comprises a waveguide combiner.

9. The optical device of claim 1, wherein a frequency of the first local oscillator signal corresponds to a frequency of the first optical carrier signal, and
wherein a frequency of the second local oscillator signal corresponds to a frequency of the second optical carrier signal.

10. An optical transmitter, comprising:
- a first modulation component configured to modulate a first optical carrier signal, the first modulation component including a first optical modulator to generate a first modulation signal associated with a first polarization of the first optical carrier signal and a second optical modulator to generate a second modulation signal associated with a second polarization of the first optical carrier signal;
- a second modulation component configured to modulate a second optical carrier signal, the second modulation component including a third optical modulator to generate a third modulation signal associated with the first polarization of the second optical carrier signal and a fourth optical modulator to generate a fourth modulation signal associated with the second polarization of the second optical carrier signal;
- a first polarization beam combiner configured to combine the first modulation signal and the second modulation signal to generate a first transmission signal;
- a second polarization beam combiner configured to combine the third modulation signal and the fourth modulation signal to generate a second transmission signal; and
- a multiplexing component integrated into the optical transmitter and configured to generate an output signal by multiplexing the first transmission signal and the second transmission signal, wherein the multiplexing component includes a tuning element configured to enable tuning of a phase delay of the multiplexing component to maintain an effective insertion loss associated with the optical transmitter below 0.5 decibels (dB).

11. The optical transmitter of claim 10, further comprising:
a first polarization rotator configured to rotate a polarization of the second modulation signal to the second polarization, and a second polarization rotator configured to rotate a polarization of the fourth modulation signal to the second polarization.

12. The optical transmitter of claim 10, further comprising:
- a first optical carrier signal source to generate the first optical carrier signal; and
- a second optical carrier signal source to generate the second optical carrier signal.

13. The optical transmitter of claim 10, wherein the first optical modulator, the second optical modulator, the third optical modulator, and the fourth optical modulator are in-phase (I) and quadrature (Q) phase modulators.

14. The optical transmitter of claim 10, wherein the multiplexing component comprises a delay line interferometer (DLI), a multimode interferometer (MMI), or a waveguide combiner.

15. An optical receiver, comprising:
- a demultiplexing component integrated into the optical receiver and configured to demultiplex a reception signal into a first reception signal and a second reception signal, wherein the demultiplexing component includes a tuning element configured to enable tuning of a phase delay of the demultiplexing component to maintain an effective insertion loss associated with the optical receiver below 0.5 decibels (dB);
- a first polarization beam splitter configured to split the first reception signal into a first optical signal associated with a first polarization and a second optical signal associated with a second polarization;
- a second polarization beam splitter configured to split the second reception signal into a third optical signal associated with the first polarization and a fourth optical signal associated with the second polarization;
- a first demodulation component configured to mix the first optical signal and the second optical signal with a first local oscillator signal to demodulate the first optical signal and the second optical signal; and
- a second demodulation component configured to mix the third optical signal and the fourth optical signal with a second local oscillator signal to demodulate the third optical signal and the fourth optical signal.

16. The optical receiver of claim 15, further comprising:
a first polarization rotator configured to rotate a polarization of the second optical signal to the first polarization, and a second polarization rotator configured to rotate a polarization of the fourth optical signal to the first polarization.

17. The optical receiver of claim 15, further comprising:
a first local oscillator signal source to generate the first local oscillator signal; and
a second local oscillator signal source to generate the second local oscillator signal.

18. The optical receiver of claim 15, wherein the first demodulation component and the second demodulation component are optical hybrid mixers.

19. The optical receiver of claim 15, wherein the demultiplexing component comprises a delay line interferometer (DLI) or a multimode interferometer (MMI).

20. The optical receiver of claim 15, wherein the demultiplexing component is polarization independent.

* * * * *